United States Patent
Takizawa et al.

(10) Patent No.: US 9,038,417 B2
(45) Date of Patent: May 26, 2015

(54) METHOD FOR PRODUCING GLASS SUBSTRATE FOR MAGNETIC DISK AND METHOD FOR MANUFACTURING MAGNETIC DISK

(71) Applicant: HOYA CORPORATION, Tokyo (JP)

(72) Inventors: Toshio Takizawa, Tokyo (JP); Takumi Koshimizu, Tokyo (JP); Yoshinori Marumo, Tokyo (JP); Masahiro Katagiri, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/275,630

(22) Filed: May 12, 2014

(65) Prior Publication Data

US 2014/0248424 A1    Sep. 4, 2014

Related U.S. Application Data

(62) Division of application No. 12/088,851, filed as application No. PCT/JP2007/055420 on Mar. 16, 2007, now Pat. No. 8,763,428.

(60) Provisional application No. 60/785,283, filed on Mar. 24, 2006.

(30) Foreign Application Priority Data

Jun. 30, 2006 (JP) .................................. 2006-182441
Jun. 30, 2006 (JP) .................................. 2006-182550

(51) Int. Cl.
*C03C 19/00*    (2006.01)
*B24B 7/24*    (2006.01)
(Continued)

(52) U.S. Cl.
CPC .................. *B24B 7/241* (2013.01); *C03C 19/00* (2013.01); *C03C 23/0075* (2013.01); *G11B 5/8404* (2013.01)

(58) Field of Classification Search
CPC .......... C03C 19/00; B24B 7/24; B24B 7/241; B24B 7/242; B24B 7/247
USPC .............................................................. 65/61
See application file for complete search history.

(56) References Cited

U.S. PATENT DOCUMENTS

| | | |
|---|---|---|
| 4,178,270 A | 12/1979 | Fujita et al. |
| 4,968,381 A | 11/1990 | Prigge et al. |

(Continued)

FOREIGN PATENT DOCUMENTS

| | | |
|---|---|---|
| CN | 1475542 A | 2/2004 |
| CN | 1579706 A | 2/2005 |

(Continued)

OTHER PUBLICATIONS

Japanese Office Action corresponding to Japanese Patent Application No. 2006-182550, dated Dec. 22, 2009.

(Continued)

*Primary Examiner* — Cynthia Szewczyk
(74) *Attorney, Agent, or Firm* — Sughrue Mion, PLLC

(57) ABSTRACT

When mirror polishing is performed on a glass substrate by bringing a polishing pad into contact with the surface of the glass substrate while supplying a polishing liquid containing polishing grains to the substrate surface, the pH of the polishing liquid is maintained within a certain range or the agglomeration degree or dispersion degree of the polishing liquid is controlled. Consequently, an adequate mirror polishing rate can be maintained and there can be obtained a glass substrate having a good end shape.

7 Claims, 2 Drawing Sheets

(51) Int. Cl.
*C03C 23/00* (2006.01)
*G11B 5/84* (2006.01)

(56) References Cited

U.S. PATENT DOCUMENTS

| | | | |
|---|---|---|---|
| 6,236,542 | B1 | 5/2001 | Hartog et al. |
| 6,277,465 | B1 | 8/2001 | Watanabe et al. |
| 6,332,338 | B1 | 12/2001 | Hashimoto et al. |
| 6,395,634 | B1 | 5/2002 | Miyamoto |
| 6,811,583 | B2 | 11/2004 | Ishibashi |
| 6,877,343 | B2 | 4/2005 | Watanabe et al. |
| 7,413,832 | B2 | 8/2008 | Koike et al. |
| 7,732,101 | B2 | 6/2010 | Koike et al. |
| 8,038,512 | B2 | 10/2011 | Saito et al. |
| 2002/0019202 | A1 | 2/2002 | Thomas et al. |
| 2002/0102923 | A1 | 8/2002 | Sugiyama et al. |
| 2003/0228461 | A1 | 12/2003 | Yoshikawa et al. |
| 2004/0132385 | A1 | 7/2004 | Kitayama et al. |
| 2004/0175942 | A1 | 9/2004 | Chang et al. |
| 2005/0032465 | A1 | 2/2005 | Fujii et al. |
| 2005/0162956 | A1 | 7/2005 | Ikenishi et al. |
| 2005/0208883 | A1 | 9/2005 | Yoshida et al. |
| 2007/0167116 | A1 | 7/2007 | Yoshida et al. |
| 2009/0158775 | A1 | 6/2009 | Takizawa et al. |
| 2011/0165824 | A1 | 7/2011 | Saito et al. |

FOREIGN PATENT DOCUMENTS

| | | | |
|---|---|---|---|
| JP | 7240025 | A | 9/1995 |
| JP | 10195421 | A | 7/1998 |
| JP | 10241144 | A | 9/1998 |
| JP | 2001148117 | A | 5/2001 |
| JP | 2001288456 | A | 10/2001 |
| JP | 2002150548 | A | 5/2002 |
| JP | 2003160781 | A | 6/2003 |
| JP | 200463062 | A | 2/2004 |
| JP | 2004059871 | A | 2/2004 |
| JP | 2004067928 | A | 3/2004 |
| JP | 2004098278 | A | 4/2004 |
| JP | 2004145958 | A | 5/2004 |
| JP | 2005023266 | A | 1/2005 |
| JP | 2005034986 | A | 2/2005 |
| JP | 2005063530 | A | 3/2005 |
| JP | 2005144452 | A | 6/2005 |
| JP | 2005262413 | A | 9/2005 |
| JP | 2007070548 | A | 3/2007 |
| JP | 2007257811 | A | 10/2007 |

OTHER PUBLICATIONS

Japanese Office Action corresponding to Japanese Patent Application No. 2006-182441, dated Dec. 22, 2009.
Chinese Office Action corresponding to Chinese Application No. 200780001229.5, dated Mar. 9, 2010.
Chinese Office Action corresponding to Chinese Application No. 200780001229.5, dated Mar. 28, 2014.
Hu Changwei, et al, "University Chemistry", dated Aug. 2004, 1$^{st}$ edition, pp. 11-17.
M. Hoziz et al, "Colloidal LLT Zeolite Synthesized Under Microwave Irradiation", Studies in Surface Science and Catalysis, vol. 158, Aug. 26, 2005.
Japanese Office Action corresponding to Japanese Patent Application No. 2010-163308, dated Jun. 12, 2012.

|  | pH | POLISHING RATE (μm/MINUTE) |
|---|---|---|
| EXAMPLE 1 | 2.0 | 0.25 |
| EXAMPLE 2 | 1.0 | 0.28 |
| EXAMPLE 3 | 2.5 | 0.25 |
| EXAMPLE 4 | 3.0 | 0.20 |
| EXAMPLE 5 | 0.8 | 0.10 |
| EXAMPLE 6 | 4.0 | 0.10 |

|  | pH | ZETA POTENTIAL (mV) | DUBOFF VALUE(nm) |
|---|---|---|---|
| REFERENCE 1 | 1.8 | -11.3 | -3.97 |
| REFERENCE 2 | 2.1 | -24.7 | -3.47 |
| REFERENCE 3 | 2.2 | -32.6 | -2.97 |
| REFERENCE 4 | 2.1 | -3.8 | -23.73 |

FIG.4

|  | pH | ZETA POTENTIAL (mV) | DUBOFF VALUE(nm) |
|---|---|---|---|
| EXAMPLE 1 | 1.8 | -11.3 | -3.97 |
| EXAMPLE 2 | 2.1 | -24.7 | -3.47 |
| EXAMPLE 3 | 2.2 | -32.6 | -2.97 |
| (COMPARATIVE EXAMPLE 1) | 2.1 | -3.8 | -23.73 |

FIG.5

|  | pH | POLISHING RATE (μm/MINUTE) |
|---|---|---|
| REFERENCE 1 | 2.0 | 0.25 |
| REFERENCE 2 | 1.0 | 0.28 |
| REFERENCE 3 | 2.5 | 0.25 |
| REFERENCE 4 | 3.0 | 0.20 |
| REFERENCE 5 | 0.8 | 0.10 |
| REFERENCE 6 | 4.0 | 0.10 |

METHOD FOR PRODUCING GLASS SUBSTRATE FOR MAGNETIC DISK AND METHOD FOR MANUFACTURING MAGNETIC DISK

This is a divisional of application Ser. No. 12/088,851 filed Mar. 31, 2008, which is the National Stage Entry of PCT/JP2007/055420 filed on Mar. 16, 2007, as well as the content of U.S. Application 60/785,283 filed Mar. 24, 2006; Japanese Patent Application 2006-182550 filed Jun. 30, 2006, and Japanese Patent Application 2006-182441 filed Jun. 30, 2006; from which priority has been claimed in the prior application, is considered part of the disclosure of the accompanying Divisional application and is hereby incorporated by reference.

TECHNICAL FIELD

This invention relates to a method for producing a glass substrate for magnetic disks and also to a method for manufacturing a magnetic disk.

BACKGROUND ART

Magnetic disks are those magnetic recording media mounted in hard disk drives. The magnetic disk is fabricated by successively laminating an underlying layer, a magnetic layer, a protective layer and a lubricant layer on a disk-shaped substrate.

One of important parts of the magnetic disk is a substrate. A magnetic film and the like are formed on a substrate as reflecting a surface profile of the substrate, so that the surface profile of the magnetic disk is determined depending of the surface profile of the substrate.

With hard disk drives, a magnetic head serving as an information recording and reproducing means is moved over a magnetic disk serving as an information accommodation means at high speed while keeping a narrow floating gap, thereby permitting the information to be written or read thereon. The contact between the magnetic head and the magnetic disk may bring about a serious trouble. When the floating height of a magnetic head is decreased, the recording density of information recorded on a magnetic disk can be improved. In order to lessen the floating height of a magnetic head, the magnetic disk has to be smooth on the surface thereof.

Accordingly, for improving the performance of a hard disk drive, it is necessary that the surface of a magnetic disk be smooth. In order to enable the surface of a magnetic disk to be smoothed, the surface of a substrate should be smooth.

From this standpoint, a glass substrate is very useful as a substrate for magnetic disk which is mounted in hard disk drives. This is for the reason that the glass substrate can be made smooth.

With respect to glass substrates for magnetic disk, there is known, for example, the following document. For instance, JP-A-H07-240025, which is a Japanese Unexamined Patent Application Publication, is known.

In this document, a super polishing process wherein a disk substrate is polished on the surface thereof is disclosed. More particularly, it is disclosed that a sulfuric acid solution of colloid silica slurry is adjusted to an acidic pH, for example, of about 0.6 to 0.9, followed by polishing a glass substrate. In this document, it is also disclosed that it is important to note that a final pH and component concentrations are important in controlling a rate of removing a substrate member from a disk substrate. This document discloses a magnetic disk substrate comprising a substrate member having a surface roughness of smaller than 4 Å. It will be noted that documents like this include U.S. Pat. Nos. 6,236,542 and 6,801,396.

As other document, there is known JP-A-H10-241144 that is a Japanese Unexamined Patent Application Publication. In this document, there is disclosed a technique wherein using, for example, a colloidal silica polishing liquid, a glass substrate for information recording medium is polished. It is to be noted that documents like this includes U.S. Pat. Nos. 6,277,465 and 6,877,343.

Likewise, there is known JP-A-2004-063062 that is a Japanese Unexamined Patent Application Publication. In this document, in the polishing of a glass substrate for information recording media, there is used, as a polish, a suspension of particles made of silicon dioxide ($SiO_2$) as a main component and having an average size of 100 nm or below. The polishing treatment is carried out according to two steps including the steps of polishing a glass substrate with an acidic polish having a pH of 4 or below and polishing the glass substrate with an alkaline polish having a pH of not less than 8.5. It will be noted that a document like this includes U.S. Published Patent Application No. 2003/0228461.

Patent Document 1: JP-A-H07-240025
Patent Document 2: U.S. Pat. No. 6,236,542
Patent Document 3: U.S. Pat. No. 6,801,396
Patent Document 4: JP-A-H10-241144
Patent Document 5: U.S. Pat. No. 6,277,465
Patent Document 6: U.S. Pat. No. 6,877,343
Patent Document 7: JP-A-2004-063062
Patent Document 8: U.S. Published Patent Application No. 2003/0228461

DISCLOSURE OF INVENTION

Problem to be Solved by the Invention

In recent magnetic disks, need is involved in storing information at a recording density, for example, of as high as 100 gigabits or over per unit square inch. Although hard disk drives have been long utilized as an external memory of personal computers, their range of utility as a storage for recording video signals has been abruptly enlarged in recent years. Therefore, information amount to be stored in hard disk drives has increased rapidly.

For a first means for responding this need, there is mentioned a method wherein an information storage capacity per unit area on the surface of a magnetic disk is increased to effectively use a limited disk area.

In order to realize such a high recording density, is becomes necessary to set a floating height of a magnetic head, for example, at 8 nm or below. This is because a more reduced floating height of the magnetic head leads to a more improved S/N ratio of recording signals. To this end, it is needed that a glide height of a magnetic disk be at 4 nm or below. The "glide height of a magnetic disk at 4 nm or below" means that if a magnetic head is allowed to float and fly over a magnetic disk at a floating height of 4 nm, there occurs no contact with the magnetic disk, thereby not causing a crashing failure.

Another second means includes a method of enlarging an information recording and reproducing area of a magnetic disk. When the recording and reproducing area is extended to the vicinity of an outer edge, an information amount stored in one magnetic disk can be efficiently increased. This brings about a necessity of not causing a crash failure without contact of the magnetic head with the magnetic disk even at the vicinity of an outer edge of the main surface of the magnetic disk.

As a further third means, there is a method using a vertical magnetic recording system as a recording system of a magnetic disk. The vertical recording system is one wherein recorded magnetization is oriented along a direction normal to a plane of a disk. The orientation of recorded magnetization in a direction normal to the disk plane permits the magnetization in the vicinity of a bit boundary to be stabilized. For this, the vertical magnetization recording system is more advantageous, as a recording system corresponding to high recording density, over in-plane magnetic recording systems. For a magnetic disk corresponding to a vertical magnetic recording system, a so-called perpendicular double-layered medium wherein a soft magnetic layer is interposed between a magnetic recording layer and a substrate is beneficial.

Recently, hard disk drives have been in frequent use for portable purposes. For instance, they are, in many cases, mounted in mobile devices to be frequently moved from one to another such as portable information terminals, car navigation systems, cellular phones and the like. The hard disk drive of such a use as mentioned above is limited in size, for which a magnetic disk used is of a small size. The small-sized magnetic disk includes, for example, a 1.8-inch magnetic disk, a 1-inch magnetic disk, a 0.85-inch magnetic disk or the like.

Such small-sized hard disk drives have a small main surface area of a magnetic disk, for which there is especially a great need for means that ensures a high information capacity. In addition, there is also a great need for high impact resistance because they are designed as a portable hard disk drive and thus, have a great possibility of being exposed to vibrations and impact shock.

Further, there is a great need for mass production and low price relative to magnetic disks and substrates therefor. As set out hereinabove, this is because hard disk drives are advantageous in that they are high in capacity and excellent in portability and can be made small in size, and thus, the market has been sharply grown since 2005.

Glass substrates are especially preferred for use as a substrate for magnetic disks, which satisfies the needs for such hard disk drives. The reason for this is that a glass substrate is able to provide excellent smoothness when subjected to mirror polishing, and can effectively cope with a problem on a small floating height of a magnetic head. In addition, since rigidity is high, an impact resistance becomes excellent.

Nevertheless, if a glass substrate for magnetic disks, which is especially suited for the need of recent hard disk drives, is mass-produced, many troubles are brought about. In particular, if the process of making a glass substrate for magnetic disk corresponding to a low glide height is adapted to mass production, it becomes necessary to innovate the process of mirror polishing a main surface of the glass substrate.

For example, if it is intended to set the glide height at 4 nm or below, it takes a very long processing time for the mirror polishing of the glass substrate surface. This makes it difficult to ensure a satisfactory amount of production. The provision of a glass substrate for magnetic disk that is high in quality and inexpensive becomes difficult. When a glass substrate for magnetic disk having a smooth surface corresponding to a low glide height is made, the floating of a magnetic head is prone to become instabilized in the vicinity of an outer edge of the disk along with concern that expansion of an information recording and reproducing area is impeded.

Further, it has been found that in the polishing methods disclosed in the above-indicated documents, the polishing rate lowers during the course of the polishing, with some cases where the productivity of the glass substrate for magnetic disk is worsened. The prior art polishing methods have had the drawback that the resulting glass substrate is worsened in end shape. Accordingly, if the floating height of a magnetic head is lowered, the magnetic head is in contact with an end portion of a magnetic disk, sometimes resulting in crashing.

The invention has been accomplished so as to solve such problems as set forth above and a first object of the invention is to provide a magnetic disk capable of achieving an information recording density of not less than 100 gigabits per unit square inch and a glass substrate for the magnetic disk.

A second object of the invention is to provide a magnetic disk that permits a floating height of a magnetic head to be at 8 nm or below and a glass substrate for such magnetic disk.

A third object of the invention is to provide a magnetic disk capable achieving a glide height of 4 nm or below and a glass substrate for the magnetic disk.

A fourth object of the invention is to provide a magnetic disk wherein a magnetic head is able to record and reproduce information even in the vicinity of an outer edge of the magnetic disk and a glass substrate for the magnetic disk.

A fifth object of the invention is to provide a magnetic disk corresponding to a vertical magnetic recording system and a glass substrate for the magnetic disk.

A sixth object of the invention is to provide a small-sized magnetic disk such as 1.8-inch, 1.0-inch and the like disks and a glass substrate suited for the magnetic disk.

A seventh object of the invention is to provide a magnetic disk suited for mass production and a glass substrate for the magnetic disk.

Another object of the invention is to provide a method for making a glass substrate for magnetic disk, which ensures high productivity without lowering a polishing rate during the polishing and a method for manufacturing a magnetic disk.

A further object of the invention is to provide a method for making a glass substrate for magnetic disk having a good end shape.

Measure for Solving the Problems

The invention is directed to those inventions including at least the following inventive arrangements.
(Inventive Arrangement 1)

A method for making a glass substrate for magnetic disk including a mirror polishing treatment of a glass substrate, wherein the mirror polishing treatment includes contacting a polishing pad with a surface of a glass substrate, supplying a polishing liquid containing polishing grains to the surface of the glass substrate, subjecting the glass substrate and the polishing pad to relative movement to mirror polish the surface of the glass substrate and that when a plurality of glass substrates are subjected to the mirror polishing treatment, the polishing liquid is kept at a certain pH.
(Inventive Arrangement 2)

A method for making a glass substrate for magnetic disk as recited in Arrangement 1, wherein the polishing liquid is composed of an acidic polishing liquid containing an inorganic acid and a buffer agent.
(Inventive Arrangement 3)

A method for making a glass substrate for magnetic disk as recited in Arrangement 1 or 2, wherein the polishing liquid is composed of an acidic polishing liquid containing an organic acid.
(Inventive Arrangement 4)

A method for making a glass substrate for magnetic disk as recited in any one of Arrangements 1 to 3, wherein the glass substrate is made of glass having a glass skeleton of a network structure and a modifying ion modifying the network structure.

(Inventive Arrangement 5)

A method for making a glass substrate for magnetic disk as recited in any one of Arrangements 1 to 4, wherein a pH of the polishing liquid is kept at 3 or below during the course of the mirror polishing treatment.

(Inventive Arrangement 6)

A method for making a glass substrate for magnetic disk as recited in any one of Arrangements 1 to 5, wherein the polishing liquid contains sulfuric acid.

(Inventive Arrangement 7)

A method for making a glass substrate for magnetic disk as recited in any one of Arrangements 1 to 6, wherein the polishing liquid contains tartaric acid or maleic acid.

(Inventive Arrangement 8)

A method for making a glass substrate for magnetic disk as recited in any one of Arrangements 1 to 7, wherein the polishing grains include colloidal silica particles.

(Inventive Arrangement 9)

A method for making a glass substrate for magnetic disk as recited in any one of Arrangements 1 to 8, wherein the mirror polishing treatment includes moving a plurality of glass substrates, sandwiched between an upper platen and a lower platen through the polishing pads, relative to the upper platen and lower platen to mirror polish opposite surfaces of the plurality of glass substrates at the same time.

(Inventive Arrangement 10)

A method for making a glass substrate for magnetic disk as recited in any one of Arrangements 1 to 9, wherein the platens are, respectively, made of a material having a corrosion resistance against an acid.

(Inventive Arrangement 11)

A method for making a glass substrate for magnetic disk as recited in any one of Arrangements 1 to 10, the method further including a pre-polishing treatment for pre-polishing the glass substrate prior to the mirror polishing treatment, wherein the pre-polishing treatment includes contacting a polishing pad on a surface of the glass substrate, supplying a polishing liquid containing polishing grains to the surface of the glass substrate, and relatively moving the glass substrate and the polishing pad thereby mirror polishing the surface of the glass substrate wherein the polishing grains contained in the polishing liquid used in the pre-polishing treatment include cerium oxide polishing grains from which grains having a size of not smaller than 4 nm are removed.

(Inventive Arrangement 12)

A method for making a glass substrate for magnetic disk as recited in any one of Arrangements 1 to 11, the method further including a pre-polishing treatment for pre-polishing the glass substrate prior to the mirror polishing treatment, wherein the pre-polishing treatment includes contacting a polishing pad on a surface of the glass substrate, supplying a polishing liquid containing polishing grains to the surface of the glass substrate, and relatively moving the glass substrate and the polishing pad thereby mirror polishing the surface of the glass substrate, wherein the polishing pad used in the pre-polishing treatment is one that contains zirconium oxide and cerium oxide.

(Inventive Arrangement 13)

A method for manufacturing a magnetic disk, including forming magnetic layers formed on the glass substrate made according to a method for making a glass substrate as recited in any one of Arrangements 1 to 12.

(Inventive Arrangement 14)

A method for manufacturing a magnetic disk as recited in Arrangement 13, wherein at least one layer of the magnetic layers is made up of a soft magnetic layer, thereby providing a vertical magnetic recording disk.

(Other Arrangement)

In other embodiment of the invention, there is provided a method for making a glass substrate for magnetic disk which includes a mirror polishing step including contacting a polishing pad on a surface of a multi-component glass substrate, supplying a polishing liquid containing polishing grains to a surface of the glass substrate and relatively moving the glass substrate and the polishing pad to polish the surface of the glass substrate, wherein a pH value of the polishing liquid is kept within a certain range. In this case, the pH value of the polishing liquid is preferably kept at from 1 to 3.

In this embodiment, the polishing liquid should preferably contain an inorganic acid so as to make an acidic pH value of the polishing liquid and a buffer agent for keeping the pH value of the polishing liquid constant. The inorganic acid is preferably sulfuric acid and the buffer agent is preferably an organic acid. The organic acid is more preferably tartaric acid or maleic acid.

In a further embodiment of the invention, there is provided a method for making a glass substrate for magnetic disk including a mirror polishing step which includes contacting a polishing pad with a surface of a multi-component glass substrate, supplying a polishing liquid containing polishing grains to a surface of the glass substrate, and relatively moving the glass substrate and the polishing pad to polish the surface of the glass substrate, wherein the mirror polishing procedure is preferably carried out in such a way that the polishing liquid is controlled to have such a degree of coagulation or dispersion in the polishing liquid to provide a Duboff value, indicating an end shape of the glass substrate obtained in the mirror polishing step, of ±10 nm.

In the practice of the invention, it is preferred that a zeta potential of the polishing grains contained in the polishing liquid is not larger than −10 mV or not less than +10 mV.

In the invention, the polishing liquid is preferably acidic. In the case where the pH value of the polishing liquid is at 2.0, the zeta potential of the polishing grains is preferably not larger than −10 mV or not less that +10 mV. In case where the pH value of the polishing liquid is at 3.0, the zeta potential of the polishing grains is preferably not larger than −30 mV or not less than +30 mV. The polishing grains contained in the polishing liquid are preferably made of colloidal silica particles.

Further, in the practice of the invention, the polishing grains contained in the polishing liquid are preferably made of colloidal silica particles.

In the invention, the glass substrate preferably contains a glass skeleton of a network structure and a modifying ion modifying the network structure.

In the invention, the glass substrate preferably includes, as main components, from 58 wt % to 75 wt % of $SiO_2$, from 5 wt % to 23 wt % of $Al_2O_3$, from 3 wt % to 10 wt % of $Li_2O$, and from 4 wt % to 13 wt % of $Na_2O$.

In the invention, the mirror polishing step preferably includes sandwiching the glass substrate between an upper platen and a lower platen through the polishing pad, supplying a polishing liquid containing polishing grains to a surface of the glass substrate, and relatively moving the glass substrate and the upper and lower platens to mirror polish the surface of the glass substrate.

In the invention, the upper platen and the lower platen are preferably made of a material having a corrosion resistance against acids, respectively.

In the invention, it is preferred to further include, prior to the mirror polishing step, a pre-polishing step for pre-polishing the glass substrate on the surface thereof, the pre-polishing step including contacting a polishing pad with the glass substrate on the surface thereof, supplying a polishing liquid containing polishing grains to the surface of the glass substrate, and relatively moving the glass substrate and the polishing pad to polish the surface of the glass substrate wherein the polishing grains in the pre-polishing step are made of cerium oxide particles having a grain size of smaller than 4 μm. In addition, the polishing pad used in the pre-polishing step preferably contains zirconium oxide particles or cerium oxide particles.

The method for manufacturing a magnetic disk according to the invention includes forming a magnetic film on the glass substrate made by use of the method for making a glass substrate for magnetic disk. Moreover, the method for manufacturing a magnetic disk according to the invention includes forming at least one soft magnetic layer on the glass substrate to obtain a vertical magnetic recording disk.

Effects of the Invention

According to the invention, there can be provided manufacturing methods including a method for making a glass substrate for magnetic disk and a method for manufacturing a magnetic disk, which are able to secure high productivity without lowering a polishing rate in the midway of the polishing treatment.

BRIEF DESCRIPTION OF DRAWINGS

FIG. 4 is a chart indicating, as a table, the relationship between the zeta potential of polishing grains and the end shape of a glass substrate after carrying out a mirror polishing step related to Examples 1 to 3 according to a further embodiment of the invention and Comparative Example 1.

FIG. 5 is a chart indicating, as a table, the relationship between the pH value of a polishing liquid and the polishing rate related to References 1 to 6 of the invention.

Figures 1, 2, 3:
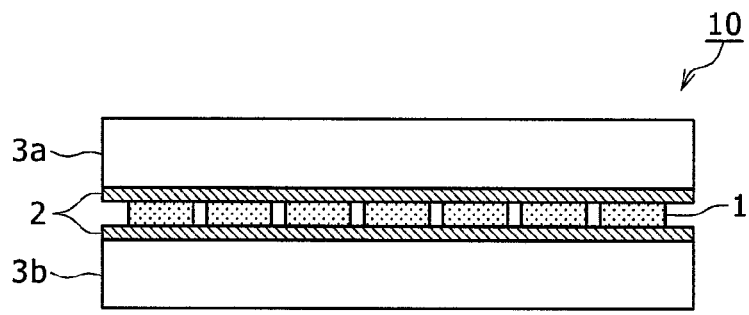
FIG. 1 is a sectional view of a polishing device for carrying out a method for making a glass substrate for magnetic disk according to one embodiment of the invention.
FIG. 2 is a chart indicating, as a table, the relationship between the pH value of a polishing liquid and the polishing rate in Examples 1 to 6 according to another embodiment of the invention.
FIG. 3 is a chart indicating, as a table, the relationship between the zeta potential of polishing grains and the end shape of a glass substrate 1 after having been subjected to a mirror polishing step in References 1 to 4 of the invention.

DESCRIPTION OF REFERENCE NUMERALS 1 glass substrate
2 polishing pad
3a upper platen
3b lower platen
10 polishing device

BEST MODE FOR CARRYING OUT THE INVENTION

[First Embodiment]
Amorphous glass is suited as a glass substrate for magnetic disk. This is because amorphous glass is made very smooth on the surface thereof by mirror polishing unlike, for example, crystallized glass and glass ceramics.

Multi-component glasses such as aluminosilicate glass and the like are preferably used as a glass material of the glass substrate for magnetic disk. Of glasses, aluminosilicate glass has a feature in that it is better in heat and chemical resistances than, for example, borosilicate glass. Accordingly, upon exposure to a chemical solution such as in a cleaning step, there is a reduced possibility of a mirror-polished surface being roughened excessively and thus, such a glass is suitable for use as a glass substrate for magnetic disk, in which smoothness is especially required. The aluminosilicate glass means a glass containing oxides of silicon and aluminium as main components.

Although a glass substrate is suited for magnetic disks, a difficulty has been involved in increasing a processing rate of mirror polishing treatment to ensure mass production. Accordingly, limitation is placed on an production amount, for which production costs are liable to rise with a difficulty in low-cost supply on the market.

The present inventors have made intensive studies on these problems and discovered that a hydrogen ion concentration (pH value) of a polishing liquid varies in the course of a polishing treatment of a glass substrate, which is one of factors of lowering a polishing rate. It has also been discovered as one of factors that the variation of the pH value occurs due to the elution, in an acidic solution, of ions contained in the glass substrate.

The variation of the pH value of the polishing liquid is apt to occur especially, when a multi-component glass substrate is polished. For instance, when an aluminosilicate glass substrate is polished with an acidic polishing liquid containing colloidal silica polishing grains, an aluminium ion is sometimes dissolved out from the multi-component glass substrate in the acidic polishing liquid, thereby causing the pH value of the polishing liquid to be varied. Besides, if glass to be polished contains sodium, potassium and the like, there is the possibility that such sodium, potassium and the like ions are dissolved out in the polishing liquid, thereby causing the pH value of the polishing liquid to be varied.

It will be noted that as a method of mirror polishing a glass substrate for magnetic disk, there may be some cases where a polishing liquid containing colloidal silica polishing grains is adjusted to acidity or alkalinity, followed by supplement and polishing. For example, JP-A-H07-240025 mentioned in the Technical Background is one instance of polishing after adjusting a slurry containing colloidal silica to a given acidity.

According to the studies made by the present inventors, it has been found that especially, with a multi-component glass, an ion contained in the glass is likely to dissolve out in a polishing liquid in the course of a mirror polishing treatment. With aluminosilicate glass, an aluminium ion is liable to dissolve out. If sodium, potassium and the like are contained in the glass, there is concern that sodium, potassium and the like ions may dissolve out in the polishing liquid.

If a polishing liquid is adjusted to acidity, the liquidity of the polishing liquid is more apt to be disturbed as these ions are dissolved out. According to the studies of the present inventors, it has been found that when an aluminosilicate glass substrate is subjected to a mirror polishing treatment with an acidic polishing liquid containing colloidal silica polishing grains, the pH of the polishing liquid is liable to vary from a given pH during the course of mass production. It has also been found that the disturbance in liquidity of the polishing liquid results in the variation in processing rate of the mirror polishing treatment.

If the pH of the polishing liquid used in the polishing treatment is adjusted to a predetermined level, an initially adjusted pH is gradually changed during the course of the polishing treatment of a plurality of glass substrates. The present inventors found that when glass substrates are mass-produced, this change becomes non-negligible.

Among glass substrates, a glass substrate for magnetic disk should have a very smooth surface because a magnetic head passes at a high speed while keeping a small floating gap or amount. Accordingly, when a glass substrate for magnetic disk is subjected to mirror polishing treatment, it is necessary to keep a constant liquidity of the polishing liquid.

In order to allow a glass substrate for magnetic disk to be mass-produced, it is necessary that the polishing rate of the mirror polishing treatment be kept constant. To this end, it is very effective to maintain the liquidity of a polishing liquid constant in the mirror polishing treatment of a glass substrate for magnetic disk.

As a specific method of keeping the pH of a polishing liquid at a constant level, it is effective to add, to the polishing liquid, an ingredient for keeping the pH constant. A chemical solution keeping a polishing liquid at a given pH may be contained.

(Polishing Liquid)

It is preferred to keep the pH of a polishing liquid acidic. This is because to keep the polishing liquid acidic during the mirror polishing treatment contributes to chemical change of a glass surface thereby improving a polishing rate. Especially, where a multi-component glass is used as a material for a glass substrate 1 and the glass substrate 1 is immersed in an acidic polishing liquid, metallic ions are likely to release from the network structure of SiO thereby enabling a polishing rate to be improved.

For instance, a multi-component glass is preferred in the sense that metallic ions such as of aluminium, sodium, potassium and the like, which are modifying ions, are contained in the network structure of the SiO glass skeleton. When the polishing liquid is kept acidic, these metallic ions are likely to release from the network structure of SiO, thereby showing the action of improving a mirror polishing rate. On the other hand, the metallic ions are dispersed in the polishing liquid, so that the pH value of the polishing liquid increases with time and it becomes difficult to keep a desired mirror polishing rate. In the practice of the invention, however, the mirror polishing rate can be kept as desired.

As an ingredient for keeping the pH of the polishing liquid constant, it is preferred to contain a buffer agent to the polishing liquid. Organic acids are preferred because of their buffering action. For an ingredient used to make the pH of the polishing liquid acidic, inorganic acids are preferably used.

The pH of the polishing liquid is kept at 3 or below, preferably 2.5 or below, more preferably 2 or below. To keep the polishing liquid at such an acidic level enables a mirror polishing rate of a glass substrate, particularly, a multi-component glass substrate or an aluminosilicate glass substrate, to be kept at a level suited for mass production.

The pH of the polishing liquid should not be excessively acidic. This is because there is high concern that a polishing device is corroded. If the polishing device is corroded, there is concern that fine foreign matters (e.g. rust) may be attached to the mirror polished glass substrate. The attachment of such foreign matters to the surface of the glass substrate adversely influences a magnetoresisatnce effect element utilized as a reproducing element of a magnetic head, thereby bringing about a thermal asperity error in information reproducing signals.

Colloidal silica polishing grains are suited as polishing grains for mirror polishing of a glass substrate. In this connection, if the pH is made excessively acidic, the chemical state of the colloidal silica becomes instabilized and gelation is prone to occur. If colloidal silica is gelled, its function as polishing grains is lost.

Accordingly, it is preferred that the pH value of the polishing liquid is not made acidic in excess. More particularly, the pH value is preferably 1.0 or over.

From the standpoints set out above, the pH of the polishing liquid ranges from 1.0 to 3.0, preferably from 1.0 to 2.5 and more preferably from 1.0 to 2.0.

(Method of Adjusting an Acidic Polishing Liquid) It is preferred that for adjusting a polishing liquid to acidity, an inorganic acid is contained in the polishing liquid. Use of an inorganic acid having the capability of full dissociation makes it easy to provide an acidic condition where the pH ranges, for example, from 1.0 to 3.0. Thus, this is beneficial for mirror polishing of glass substrates.

The inorganic acids include sulfuric acid, hydrochloric acid, nitric acid, boric acid, phosphoric acid, phosphonic acid, phosphinic acid and the like. With an inorganic acid having intense oxidative power, such an acid is liable to cause corrosion of a polishing device, along with concern that a thermal asperity failure may be caused.

In view of the above, the inorganic acid contained the polishing liquid preferably includes sulfuric acid, phosphoric acid or phosphonic acid. Most preferably, sulfuric acid having relatively small oxidative power is mentioned. Sulfuric acid whose oxidative power is small has the smallest possibility of corroding a polishing device. Hence, the possibility of causing the thermal asperity failure is smallest. Moreover, sulfuric acid is unlikely to evaporate or scatter in air, with the attendant advantage that the concentration in the polishing liquid can be readily kept constant when the mirror polishing treatment is carried out. It will be noted that where liquidity is adjusted by use of sulfuric acid, it is preferred that a sulfuric acid concentration in the polishing liquid ranges, for example, from 0.05 wt % to 1.00 wt %.

(Liquidity Adjusting Method)

According to such knowledge of the present inventors as stated hereinabove, the ions contained in a glass substrate are dissolved out in the polishing liquid during the polishing step to vary the pH of the polishing liquid. The variation of the pH value is one of factors of lowering a polishing rate. In order to prevent the variation of the pH of the polishing liquid in the course of the polishing step, it is preferred to contain a buffer agent in the polishing liquid.

An organic acid is preferably used as a buffer material contained in the polishing liquid. The buffer action imparted to the polishing liquid permits the pH of the polishing liquid to be kept at a desired given level. Where the pH of the polishing liquid is kept within a range of from 1 to 3, especially from 1 to 2, it is preferred to choose tartaric acid, maleic acid or maloic acid. Of these, tartaric acid or maleic acid, particularly tartaric acid, is more preferred. It will be noted that where tartaric acid is used as a buffer agent, the concentration of tartaric acid in the polishing liquid is preferably 0.05 wt % to 1.50 wt %.

The polishing liquid which is most preferred in the invention is one which includes colloidal silica polishing grains, sulfuric acid as an inorganic acid, and tartaric acid as an organic acid.

(Polishing Grains)

Where a polishing treatment (mirror polishing step) is carried out using a polishing liquid, polishing grains are contained in the polishing liquid. For the polishing grains used in the mirror polishing step, it is preferred to use colloidal silica particles. In the practice of the invention, the colloidal silica polishing grains have a grain size of not larger than 80 nm, preferably not larger than 50 nm. The use of such fine polishing particles contributes to creating a smooth mirror surface adapted as a glass substrate of magnetic disk. The lower limit of the grain size of the colloidal silica polishing grains can be determined while taking a mirror polishing rate into account. For instance, the size may be set at from 20 nm to 50 nm. The content of the colloidal silica particles in the polishing liquid is preferably from 5 wt % to 40 wt %.

(Zeta Potential of Polishing Grains)

The polishing grains dispersed in a polishing liquid has a zeta potential. If the zeta potential is closer to 0 mV than ±10 mV, polishing grains are liable to coagulate, thus resulting in poor dispersability of the polishing grains in the polishing liquid. If the dispersability in the polishing liquid becomes poor, the fluidity of the polishing grains in the vicinity of end portions of the glass substrate 1 lowers in the polishing step, with the possibility that the end shape of the glass substrate 1 after the polishing step having been carried out is worsened.

The zeta potential may be either plus or minus depending on the composition of target particles. The zeta potential of colloidal silica (colloid-shaped silica) usable as polishing grains becomes minus at a pH, for example, of 3 or over, close to zero at a pH ranging 2.0 to 3.0 and plus under lower conditions (at a pH of 1.0 or below).

In the practice of the invention, the zeta potential of colloidal silica is preferably at −10 mV or below. In particular, colloidal silica should preferably be so selected as to have a zeta potential of not larger than −10 mV in case where the pH of the polishing liquid is at 2 and a zeta potential of not larger than −30 mV in case where the pH of the polishing liquid is at 3.

With respect to the liquidity of the polishing liquid according to the invention, it is preferred that the electric conductivity of the polishing liquid is adjusted to a range of 2 mS/cm to 10 mS/cm.

(Mirror Polishing Treatment)

In the practice of the invention, the mirror polishing treatment is preferably carried out by a polishing method wherein a plurality of glass substrates are collectively subjected to mirror polishing treatment on both surfaces thereof according to a both-sided polishing method making use of a planetary gear mechanism. Because a number of glass substrates can be finished as a uniform mirror surface on both surfaces thereof, the polishing rate of the mirror polishing treatment does not vary, permitting mass production to be stably held. In addition, in the practice of the invention, it is possible to keep a constant liquidity of the polishing liquid, thus maintaining the stable mass production.

In the invention, mirror polishing can be performed by use of a polishing liquid circulation and re-utilization-type polishing apparatus. More particularly, a polishing liquid that has been once supplied to a glass substrate surface is collected and may be again supplied to a glass substrate surface after passage through a cleaning means such as of filtering or the like. In the invention, the pH of the polishing liquid can be kept at a desired given level, so that such a polishing liquid can be re-used. There may occur, not in accordance with the invention, a problem that the pH of a polishing liquid becomes prone to vary during the circulation and re-utilization of the polishing liquid.

In the mirror polishing treatment of a glass substrate for magnetic disk, the polishing liquid can be circulated and re-utilized, so that it becomes possible to abate emissions of industrial waste. Thus, a mass-production procedure of a glass substrate for magnetic disk can be established while consideration is given to the global environment.

In the practice of the invention, at least a polishing platen of the mirror polishing apparatus should preferably be made of a material that has a corrosion resistance against acids. Such materials preferably include stainless steels. Stainless steels having an excellent corrosion resistance preferably include martensite stainless steels or austenite stainless steels.

(Glass Substrate)

The glass substrate related to the invention is constituted of glass (multi-component glass). The multi-component glass includes, for example, a network structure of SiO that is a glass skeleton, and metallic ions, such as of aluminium, sodium, potassium and the like, serving as a modifying ion therefor. Where such a multi-component glass is immersed in an acidic polishing liquid, the metallic ions are likely to release from the network structure of SiO, thereby improving the polishing rate. More particularly, the glass substrate is chemically changed on the surface thereof, enabling the polishing rate to be improved.

In the invention, a preferred glass substrate is made of amorphous glass or aluminosilicate glass containing oxides of silicon and aluminium as main components. This is because the amorphous glass ensures a very smooth surface by polishing unlike, for example, crystallized glass or glass ceramics. Aluminosilicate glasses are superior in resistances to heat and chemicals to borosilicate glass and when it is exposed to a chemical solution such as in a cleaning treatment, there is a reduced possibility that the surface of the glass substrate 1 after polishing is roughened in excess.

Among aluminosilicate glasses, a glass substrate containing an alkali metal element is preferred. For example, when those glasses containing $SiO_2$ and $Al_2O_3$ and further $Na_2O$ are used, the effect of the invention can be satisfactorily shown. This is because if an aluminium ion or sodium ion is dissolved out in the polishing liquid, the pH of the polishing liquid can be kept as desired. A glass containing $Li_2O$ can also be used as preferred. For instance, glass for chemical reinforcing treatment is a type of glass containing an alkali metal element and can be preferably used in the invention.

For such a glass (multi-component glass) as set out above, there is preferably mentioned a glass including, as main components, 58 to 75 wt % of $SiO_2$, 5 to 23 wt % of $Al_2O_3$, 3 to 10 wt % of $Li_2O$ and 4 to 13 wt % of $Na_2O$.

A more preferred glass is one (aluminosilicate glass), which includes, as main components, 62 to 75 wt % of $SiO_2$, 5 to 15 wt % of $Al_2O_3$, 4 to 10 wt % of $Li_2O$, 4 to 12 wt % of $Na_2O$ and 5.5 to 15 wt % of $ZrO_2$ provided that a ratio by weight $Na_2O/ZrO_2$ is at 0.5 to 2.0 and a ratio by weight of $Al_2O_3/ZrO_2$ is at 0.4 to 2.5.

Another preferred glass includes 61 to 70 wt % of $SiO_2$, 9 to 18 wt % of $Al_2O_3$, 2 to 3.9 wt % of $Li_2O$, 6 to 13 wt % of $Na_2O$, 0 to 5 wt % of $K_2O$, 10 to 16 wt % of $R_2O$ (wherein $R_2O=Li_2O+Na_2O+K_2O$), 0 to 3.5 wt % of MgO, 1 to 7 wt % of CaO, 0 to 2 wt % of SrO, 0 to 2 wt % of BaO, 2 to 10 wt % of RO (wherein RO=MgO+CaO+SrO+BaO), 0 to 2 wt % of $TiO_2$, 0 to 2 wt % of $CeO_2$, 0 to 2 wt % of $Fe_2O_3$, 0 to 1 wt % of MnO and 0.01 to 3 wt % of $TiO_2+CeO_2+Fe_2O_3+MnO$.

With respect to the glass substrate, it is preferred that a hole is beforehand opened at a central portion of the glass substrate by use of a grinding stone to provide a disk-shaped glass substrate having a round hole at the center thereof.

It is also preferred the glass substrate is beforehand chamfered at outer and inner peripheral end faces thereof. Preferably, the glass substrate is previously ground to a given surface roughness at the outer and inner peripheral end faces and the main surface thereof.

(Pre-Polishing Step)

In the pre-polishing step, the glass substrate is relatively roughly polished on the surfaces thereof to quickly remove defects and strains from the surfaces of the glass substrate. In this sense, the mirror polishing step differs from a mirror polishing step in respect of a polishing pad, a polishing liquid and polishing grains used.

In the pre-polishing step, it is preferred to use a relatively hard polishing pad. Moreover, it is also preferred that particles having an abrasive action such as, for example, zirconium oxide particles and/or cerium oxide particles are contained beforehand.

According to the studies made by us, in a pre-polishing treatment (pre-polishing step) of a glass substrate carried out prior to the mirror polishing treatment of the glass substrate for magnetic disk, it has been found that polishing grains contained in a polishing liquid is preferably set to be within a certain range of grain size.

More particularly, in the practice of the invention, the pre-polishing treatment of a glass substrate carried out prior to the mirror polishing treatment is most preferably performed in such a way that a polishing pad containing zirconium oxide particles and cerium oxide particles is used and a maximum grain size of cerium oxide polishing grains contained in the polishing liquid is set at 4 µm or below. On the other hand, the lower limit of the grain size is preferably determined while taking into account a polishing rate in the pre-polishing step. Water can be used for a polishing liquid.

When using a polishing liquid wherein a maximum grain size is regulated at 4 µm or below, the glass substrate is suppressed from suffering defects in the surfaces thereof in the course of the pre-polishing treatment. Accordingly, in the mirror polishing treatment carried out after the pre-polishing treatment, if the glass thickness of the glass to be removed from the glass surface is made small, a desired smooth mirror surface can be obtained. This leads to a shortened polishing time required for the mirror polishing treatment.

(Arrangement of a Glass Polishing Apparatus)

Subsequently, an arrangement of a polishing device 10 used to carry out the method of making a glass substrate for magnetic disk according to the invention is illustrated with reference to FIG. 1. FIG. 1 shows a sectional arrangement of a polishing device for carrying out the method for making a glass substrate for magnetic disk according to an embodiment of the invention.

As shown in FIG. 1, the polishing device 10 is so arranged as to sandwich a glass substrate 1 to be polished between an upper platen 3a and a lower platen 3b through polishing pads 2. The polishing device 10 is arranged to sandwich a plurality of glass substrates 1 at the same time.

The upper platen 3a, lower platen 3b and glass substrate 1 can be relatively moved in horizontal directions. Such movements are possible by use of planetary gear mechanisms built in the upper platen 3a and the lower platen 3b, respectively. It will be noted that the upper platen 3a and the lower platen 3b can be moved while adding a given compression pressure against the glass substrate 1.

The upper platen 3a and the lower platen 3b are preferably constituted of a material having a corrosion resistance to acids, respectively. For instance, martensite stainless steels or austenite stainless steels are preferred as a stainless steel having an excellent corrosion resistance.

It is preferred that the hardness of a polishing pad is appropriately controlled depending on the polishing rate and the surface roughness. For example, when mirror polishing is effected, a relatively soft polishing pad 2 is preferably used so as to obtain a smooth mirror surface suited as a glass substrate for magnetic disk. On the other hand, in order to attain a high polishing rate, a relatively hard polishing pad 2 is preferably used.

(To Carry Out a Mirror Polishing Step)

Subsequently, a specific example of a method for carrying out a mirror treatment process using the polishing device set out above is illustrated.

Initially, the glass substrate 1 is set in the polishing device 10. More particularly, the glass substrate 1 is sandwiched between the upper platen 3a and the lower platen 3b through the polishing pads 2 to bring the glass substrate 1 into contact with the polishing pads 2 at opposite surfaces thereof.

Next, a polishing liquid containing such polishing grains as set out before is supplied to the surfaces of the glass substrate 1 to be polished.

Subsequently, the glass substrate 1 and the upper platen 3a and lower platen 3b are relatively moved, so that the glass substrate 1 and the polishing pads 2 are relatively moved thereby polishing the glass substrate 1 on the opposite surfaces thereof.

The polishing liquid in this mirror polishing step may be re-utilized by circulation. More particularly, a once employed polishing liquid may be collected and cleaned by filtering, followed by supplying the surfaces of the glass substrate again. In the first embodiment, since the pH value of the polishing liquid is kept by the action of such a buffer agent as set forth hereinbefore, the polishing liquid can be re-used.

When the surface roughness of the glass substrate arrives at a given value, the mirror polishing step is completed. An intended surface roughness is, fro example, such that an arithmetic mean roughness (Ra) is at 0.3 nm or below with a maximum peak (Rp) being at 2 nm or below. The maximum peak (Rp) means a height obtained by measuring a surface profile in a given region of the surface of the glass substrate 1 and calculating an average plane of the surface profile to determine a height at the highest point from the average plane used as a reference plane.

Thereafter, the glass substrate 1 is removed from the polishing device 10 and the polishing liquid and polishing grains are cleaned away from the surface of the glass substrate 1.

Next, the thus cleaned glass substrate 1 is subjected to chemical reinforcement, followed by cleaning the glass substrate to complete the fabrication of the glass substrate for magnetic disk.

(Glass Substrate for Magnetic Disk)

In the practice of the invention, it is preferred that when a smooth mirror surface formed on the glass substrate for magnetic disk is observed through an atomic force microscope, the mirror surface should have an arithmetic mean roughness (Ra) of 0.3 nm or below. The mirror surface having a maximum peak (Rp) of 2 nm or below is preferred. The maximum peak (Rp) means a height that is obtained by measuring a surface profile in a given region of the surface and calculating an average plane of the surface profile to determine a height at the highest point from the average plane used as a reference plane. Such a surface ensures a glide height of 4 nm or below. More particularly, using the glass substrate for magnetic disk according to the invention, if a floating height of a magnetic head is at 4 nm, no crashing failure takes place. Because no thermal asperity is caused against a magnetic resistance effect element mounted in a reproducing element of a magnetic head, information can be normally recorded and reproduced.

The glass substrate obtained according to the above method is smooth on the main surfaces thereof and is excellent in end shape. More particularly, the Duboff value of the glass substrate for magnetic disk obtained by the method according to this embodiment can be set within a range of ±10 nm. This Duboff value is illustrated below.

The end shape of the glass substrate can be assessed by use of the Duboff value. The Duboff value means a maximum distance (a value as viewed in section of the glass substrate 1) that is obtained by selecting arbitrary two points along a radial direction of a disk-shaped glass substrate in the periphery of the outer or inner end portion of the glass substrate 1 and connecting the points with a straight line to determine a maximum distance from the line to the surface of the glass substrate 1. The Duboff value may be either plus or minus depending on the end shape of the glass substrate 1. The end shape of the case where the Duboff value is plus is called roll-off shape and the end shape of the case where the value is minus is called ski-jump shape. A Duboff value closer to 0 indicates an end shape being good in the region.

It will be noted that the Duboff value may also be determined, in a glass substrate having a substantially flat main surface and end faces and also having chamfered faces formed between the main surface and the end faces, as a distance from a flat face in a deviation portion deviated from the flat face other than peripheries and existing in the peripheries within the main surface.

With respect to the end shape of the glass substrate, the Duboff value is preferably within a range of ±10 nm, more preferably within ±7 nm and most preferably ±5 nm. This is because when a hard disk drive using a glass substrate 1 whose Duboff value exceeds ±10 nm is made, there is a high possibility that a magnetic head is in contact with the magnetic disk fabricated using this glass substrate 1 and is crashed. The possibility of the crashing becomes greater in case of a magnetic disk of a vertical magnetic recording system. In other words, where the above glass substrate is used as a magnetic disk for vertical magnetic recording, the Duboff value should preferably be within ±10 nm.

The region where the Duboff value is to be measured may be arbitrarily set so far as it is a region of an outer periphery of the main surface of the glass substrate, i.e. a region where head floating is impeded in the case of a HDD disk. For instance, the measurement is made within a range of 92.0 to 96.9% from a center of a glass substrate when a distance from the center to an end portion of the glass substrate is taken as 100%.

More particularly, for example, with the case of a glass substrate having an outer diameter size of 2.5 inches (an outer diameter of 65 mmφ and a radius of 32.5 mm), points that are, respectively, on the glass surface at a position of 29.9 mm and at a position of 31.5 mm each from the center of the glass substrate are connected with a straight line, and a deviation between the straight line and the surface of the glass substrate in the region may be determined as a Duboff value.

The Duboff value may be obtained by measuring, for example, a range of 1 to 2.6 mm from the outer peripheral end toward the center using the outer peripheral end as a base point.

In order to make the Duboff value low, the mirror polishing step is preferably performed while controlling the zeta potential of polishing grains. More particularly, the zeta potential of polishing grains is preferably at −10 mV or below, or +10 mV or over (i.e. the absolute value is in the range of not smaller than 10 mV.

In more detail, where the pH value of a polishing liquid is at 2.0, the zeta potential of polishing grains is preferably at −10 mV or below. Where the pH value of a polishing liquid is at 3.0, it is preferred that the zeta potential of polishing grains is at −30 mV or below.

(Effects of the First Embodiment)

According to the method for making a glass substrate for magnetic disk and the method for manufacturing a magnetic disk in the first embodiment, the following effects (a) to (g) are obtained.

(a) According to the first embodiment, a buffer agent is contained in the polishing liquid, the pH value of the polishing liquid is kept within a given range, thereby not lowering a polishing rate. Accordingly, there can be provided a productive method for making a glass substrate for magnetic disk and a productive method for manufacturing a magnetic disk.

(b) According to the first embodiment, since a buffer agent is contained in the polishing liquid, the pH value of the polishing liquid is kept within a given range, not lowering a polishing rate. More particularly, a once employed polishing liquid can be circulated and re-utilized. Accordingly, an amount of discharge of industrial emissions can be reduced, thus enabling a glass substrate for magnetic disk to be mass-produced in an earth friendly manner.

(c) In the first embodiment, where the zeta potential of polishing grains in a polishing liquid is set at −10 mV or below (i.e. the absolute value is within a range of not smaller than 10 mV), the flowability of polishing grains in the vicinity of the end portions of the glass substrate can be improved. The improvement in the flowability of the polishing grains can in turn improve the end shape of the glass substrate after completion of the mirror polishing step (i.e. the Duboff value can be made small). More particularly, there can be provided a magnetic disk and a glass substrate for magnetic disk wherein a magnetic head is able to record and reproduce information even in the vicinity of the outer edge of the magnetic disk.

(d) According to the first embodiment, polishing can be made such that the resulting glass substrate for magnetic disk has a surface roughness, for example, of 0.3 nm or below as expressed by an arithmetic mean roughness (Ra) and a maximum peak (Rp) of 2 nm or below. This enables the provision of a magnetic disk and a glass substrate for magnetic disk, which are able to achieve an information recording density of not less than 100 gigabits or over per unit square centimeter.

(e) According to the first embodiment, polishing can be made such that the resulting glass substrate for magnetic disk has a surface roughness, for example, of 0.3 nm or below as expressed by an arithmetic mean roughness (Ra) and a maximum peak (Rp) of 2 nm or below. This enables the provision of a magnetic disk and a glass substrate for magnetic disk, which is adapted for use with a magnetic head whose floating height is 8 nm or below. This eventually enables an S/N ratio of a signal received with the magnetic head to be improved, thereby increasing a recording density on the magnetic disk.

(f) According to the first embodiment, polishing can be made such that the resulting glass substrate for magnetic disk has a surface roughness, for example, of 0.3 nm or below as expressed by an arithmetic mean roughness (Ra) and a maximum peak (Rp) of 2 nm or below. This enables the provision of a magnetic disk and a glass substrate for magnetic glass, wherein a glide height of 4 nm or below can be realized. This eventually enables an S/N ratio of a signal received with the magnetic head to be improved, thereby increasing a recording density on the magnetic disk.

(g) According to the first embodiment, there can be provided a small-sized magnetic disk such as of a 1.8 to inch or 1.0 to inch type and a glass substrate suited for the manufacture of the magnetic disk.

When the pre-polishing step is carried out prior to the mirror polishing step to beforehand remove defects and strains from the surface of the glass substrate 1, the polishing time of the mirror polishing step before an intended surface roughness is obtained can be shortened. Accordingly, the productivity of the magnetic disk and the glass substrate for magnetic disk can be improved.

(Method for Manufacturing a Magnetic Disk)

A magnetic disk can be manufactured by successively forming an underlying layer, a magnetic layer, a protective layer and a lubricant layer on the surface of the glass substrate for magnetic disk fabricated according to the first embodiment of the invention.

A vertical magnetic recording disk can be made by successively forming an adherent layer made of a Cr alloy, a soft magnetic layer made of a CoTaZr-based alloy, an underlying layer made of Ru, a vertical magnetic recording layer made of a CoCrPt-based alloy, a protective layer made of a hydrocarbon, and a lubricant layer made of a perfluoropolyether on the surface of the glass substrate for magnetic disk.

The method for making a glass substrate for magnetic disk according to the invention is one which includes a mirror polishing treatment of a glass substrate, wherein the mirror polishing treatment includes contacting a polishing pad on a surface of a glass substrate, supplying a polishing liquid containing polishing grains on the surface of the glass substrate and relatively moving the glass substrate and the polishing pad to subject the surface of the glass substrate to the mirror polishing treatment. The method may be so arranged that when a plurality of glass substrates are subjected to the mirror polishing treatment, the pH of the polishing liquid is kept at a constant level.

It is more preferred to arrange such that the pH of the polishing liquid is kept at 3 or below in the course of the mirror polishing treatment.

The mirror polishing treatment is preferably carried out by moving a plurality of glass substrates, sandwiched between an upper platen and a lower platen each through a polishing pad, relative to the upper platen and lower platen to mirror polish the plurality of glass substrates on opposite surfaces at the same time.

EXAMPLE 1

In this example, a glass substrate made of amorphous glass was used. This glass has a multi-component glass composition, with its type being aluminosilicate glass. This has a structure including a glass skeleton made of a network structure of SiO and aluminium as a modifying ion. In addition, the glass also contains alkali metal elements.

A specific chemical composition includes $SiO_2$: 63.5 wt %, $Al_2O_3$: 14.2 wt %, $Na_2O$: 10.4 wt %, $Li_2O$: 5.4 wt %, $ZrO_2$: 6.0 wt %, $Sb_2O_3$: 0.4 wt %, and $As_2O_3$: 0.1 wt %. This glass was shaped according to a direct pressing method to obtain a disk-shaped glass. Next, using this glass disk, a glass substrate for magnetic disk is made via the following steps.

(1) Shape Processing Step

A grindstone was used to open a hole at a central portion of the glass substrate thereby providing a disk-shaped glass substrate having a round hole at the central portion. Thereafter, an outer peripheral end face and an inner peripheral end face were chamfered.

(2) End Face Polishing Step

Next, the glass substrate was polished at end faces (inner and outer peripheries) thereof by brush polishing so that a surface roughness was at about 1 μm by Rmax and about 0.3 μm by Ra while rotating the glass substrate.

(3) Grinding Step

The surface of the glass substrate was ground by selecting a grain size of #1000 to provide a main surface having a flatness of 3 μm, a surface roughness Rmax of about 2 μm and Ra of about 0.2 μm. It will be noted that Rmax and Ra were, respectively, measured by use of an atomic force microscope (AFM) (nanoscope, made by Digital Instruments Co., Ltd.). The flatness was measured by use of a flatness measuring device and indicates a distance between the highest portion and the lowest portion of the substrate surface as viewed vertically (i.e. a difference in height).

(4) First Polishing Step (Pre-Polishing Step)

Next, a first polishing step serving as a pre-polishing step was carried out. This step was a pre-polishing step wherein the glass substrate was polished beforehand prior to a subsequent mirror polishing step. In this first polishing step, the glass surface portions having defects and strains formed in the surfaces of the glass substrate were removed by a grinding step.

The step was performed by use of a double-sided polishing apparatus wherein 100 to 200 glass substrates could be polished on opposite surfaces thereof at one time. The plurality of glass substrates were simultaneously polished on opposite surfaces thereof by moving the plurality of glass substrates, sandwiched under pressure between an upper platen and a lower platen through polishing pads, relative to the upper and lower platens. Using planetary gear mechanisms, a number of glass substrates can be polished at one time.

The polishing pad used was a hard polisher. The polishing pad used was one that beforehand contained zirconium oxide and cerium oxide. The polishing liquid contained polishing grains made of cerium oxide, in which coarse grains having a grain size exceeding 4 μm had been beforehand removed. When the polishing liquid supplied to the glass substrate was measured, the maximum size of the polishing grains was at 3.5 μm, with an average value being at 1.1 μm and a value of D50 being at 1.1 μm. Other polishing conditions were as follows.

Polishing liquid: made of cerium oxide (average size: 1.1 μm) and water.

Load exerted on the glass substrate: 80 to 100 $g/cm^2$.

Removed thickness of a surface portion of the glass substrate: set at 20 to 40 μm.

(5) Second Polishing Step (Mirror Polishing Step)

Next, the second polishing step serving as a mirror polishing step was carried out. This polishing step is mirror polishing of the glass substrate on opposite main surfaces thereof at the same time.

This process was carried out using a double-sided polishing apparatus wherein 100 to 200 glass substrates could be polished on opposite main surfaces thereof at one time. The plurality of glass substrates were polished on the opposite surfaces thereof at the same time by moving the plurality of glass substrates, sandwiched under pressure between an upper platen and a lower platen through polishing pads, relative to the upper and lower platens. A number of glass substrates could be polished at one time by use of planetary gear mechanisms.

A recycle system of a polishing liquid was operated in such a way that the polishing liquid supplied to the surface of the glass substrate during the mirror polishing treatment was collected via a drain and was again supplied to a glass substrate after cleaning by removal of foreign matters with a mesh filter. As a result, the pH of the polishing liquid did not vary in the course of the mirror polishing treatment and could be kept substantially constant. The polishing pad used was a soft polisher (with an Asker hardness lower than a hard polisher). The polishing liquid was one indicated below. The platens of the polishing device was constituted of a stainless steel material having a corrosion resistance.

Colloidal silica grains having a grain size of 40 nm were provided, to which there were added sulfuric acid used as an inorganic acid having the capability of full dissociation, and tartaric acid as an organic acid serving as a chemical solution (buffering material) having the buffering action to prepare a polishing liquid. The polishing liquid was adjusted in pH to 2.

It is possible to set a concentration of sulfuric acid in the polishing liquid at a level sufficient to obtain a desired pH. For instance, the concentration is preferably from 0.05 wt % to 1 wt %. In this example, the concentration was set at 0.15 wt %. The concentration of tartaric acid in the polishing liquid is preferably from 0.05 wt % to 1.5 wt %. In this example, the concentration was set at 0.8 wt %. The content of silica in the polishing liquid is preferably 5 to 40 wt %. In this example, the content was set at 10 wt %. The balance of the polishing liquid was ultrapure water. The measurement of an electric conductivity of the polishing liquid revealed a conductivity of 6 mS/cm.

The polishing rate in the mirror polishing step was at 0.25 µm/minute and thus, it has been found that a better polishing rate than in prior art under such conditions as set out above can be realized. It will be noted that the polishing rate was determined by dividing a reduction in thickness (machining allowance) of the glass substrate 1 necessary for finishing into a given mirror surface by a required polishing time.

(6) Cleaning Step after the Mirror Polishing Treatment

The glass substrate was subjected to alkali cleaning by immersion in a NaOH aqueous solution having a concentration of 3 to 5 wt %. It is to be noted that cleaning was carried out while applying ultrasonic waves. Moreover, the substrate was cleaned by successive immersion in cleaning vessels of a neutral detergent, pure water, pure water, isopropyl alcohol (IPA), and IPA (vapor drying). The resulting glass substrate was observed on the surface thereof by AFM (Nanoscope, made by Digital Instruments Co., Ltd.), revealing no deposition of the colloidal silica polishing grains. In addition, no foreign matters such as of stainless steel or iron were found.

(7) Chemical Reinforcement Step

Next, the glass substrate was chemically reinforced. For the chemical reinforcement, a chemical reinforcing salt made of a mixture of potassium nitrate (60%) and sodium nitrate (40%) was provided and heated to 375° C., followed by immersing therein the cleaned glass substrate preheated to 300° C. for 3 hours. The lithium ion and sodium ion in the surface layer of the glass substrate were replaced by a sodium ion and potassium ion in the chemical reinforcing salt, respectively, thereby chemically reinforcing the glass substrate. It will be noted that a compression stress layer formed as a surface layer of the glass substrate had a thickness of about 100 to 200 µm. The glass substrate after completion of the chemical reinforcement was quenched by immersion in a water vessel at 20° C. and maintained for about 10 minutes.

(8) Cleaning Step after the Chemical Reinforcement

The thus quenched glass substrate was immersed in sulfuric acid heated to about 40° C. and cleaned while applying ultrasonic waves.

(9) Step of Inspecting the Glass Substrate for Magnetic Disk

The glass substrate for magnetic disk fabricated in a manner as stated above was inspected.

The surface roughness of the glass substrate was measured by AFM (atomic force microscope), revealing that a maximum peak Rp was at 1.8 nm and an arithmetic mean roughness Ra was at 0.25 nm. The surface was in a clean mirror surface state. No foreign matters impeding the floating of a magnetic head and causing a thermal asperity problem were found in and on the surfaces.

Using the glass substrate for magnetic disk fabricated in the above-stated way, a magnetic disk for vertical magnetic recording systems was made.

(10) Step of Making a Magnetic Disk

An adherent layer made of a Cr alloy, a soft magnetic layer made of a CoTaZr-based alloy, an underlying layer made of Ru, a vertical magnetic recording layer made of a CoCrPt-based alloy, a protective layer made of a hydrocarbon, and a lubricant layer made of a perfluoropolyether were successively formed on the surface of the glass substrate, thereby making a vertical magnetic recording device.

(11) Step of Inspecting the Magnetic Disk

The thus made magnetic disk was inspected. A head for inspection whose floating height was 8 nm was floated and run over the magnetic disk, whereupon it was found that the head was not in contact with foreign matters and the like and no crashing failure took place. Next, using a magnetic head whose floating height was 8 nm and which had a reproducing element unit of a magnetic resistance effect type and a recording element unit of a single polarization type, a recording and reproducing test using a vertical recording system was carried out, confirming that information could be normally recorded and reproduced. During the test, no thermal asperity signals were detected in reproducing signals. Recording and reproducing operations could be performed at 100 gigabits per unit square inch.

Thereafter, a glide height test of the magnetic disk was conducted. This test is to confirm that the contact of a head for inspection with a magnetic disk occurs at what floating height in case where the floating height of the head for inspection is gradually lowered. As a consequence, with the magnetic disk of this example, no contact took place at a floating height of 4 nm over from an inner edge portion to an outer edge portion of the magnetic disk. The glide height at the outer edge portion of the magnetic disk was at 3.7 nm.

EXAMPLES 2 TO 6

In Examples 2 to 4, tartaric acid was contained as a buffer agent and a composition of a polishing liquid in the mirror polishing step was controlled to change the pH value of the polishing liquid within a range of from 1.0 to 3.0. Other conditions were same as in Example 1. Because of the addition of the buffer agent, no variation in the pH value of the polishing liquid was found with a lapse of time in the mirror polishing step, thereby enabling the liquidity of the polishing liquid to be kept substantially constant.

On the other hand, in Examples 5 and 6, tartaric acid was contained as a buffer agent and the composition of a polishing liquid in the mirror polishing step was controlled to change the pH value of the polishing liquid within ranges of less than 1.0 or exceeding 3.0. Other conditions were same as in Example 1. Because of the addition of the buffer agent, no variation in the pH value of the polishing liquid was found with a lapse of time in the mirror polishing step, thereby enabling the liquidity of the polishing liquid to be kept substantially constant.

As a result, it was found that in Examples 2 to 6, the variation of processing rate with time in the mirror polishing step could be reduced. This enables the variation of the processing rate to be lessened, for example, in the case of mass-producing a glass substrate for magnetic disk.

In Examples 2 to 6, the relation between the pH value of the polishing liquid and polishing rate is shown in FIG. 2. According to FIG. 2, it has been found that when tartaric acid is contained as a buffer agent and the pH value of the polishing liquid is from 1.0 to 3.0, a good polishing rate can be realized.

COMPARATIVE EXAMPLE 1

In Comparative Example 1, no tartaric acid was contained as a buffer agent in a polishing liquid in the mirror polishing step. The pH value of the polishing liquid was adjusted to 2.0 by controlling the amount of sulfuric acid in the polishing liquid. Other conditions were same as in Example 1. In Example 1 and Comparative Example 1, 1000 glass substrates for magnetic disk were, respectively, made. In Example 1, no variation of pH was found during the mirror polishing treatment, with a pH being kept substantially constant. In Comparative Example 1, the pH increased with time, resulting in a reduced polishing rate. With the case of Comparative Example 1, as the batch number increased, the roughness of the main surface of the glass substrate became greater when compared with that of the glass substrate for the same batch number in Example 1.

With Comparative Example 1, the processing time required for the mirror polishing treatment became prolonged. In other words, with Comparative Example 1, the pH value of the polishing liquid increased with an increasing time of the mirror polishing step, thereby lowering the polishing rate. More particularly, it was found that when a buffer agent was mixed in the polishing liquid, the productivity of the glass substrate for magnetic disk and the magnetic disk could be improved.

[References]

Subsequently, an experimental example (reference) is illustrated wherein while keeping a pH value within a predetermined range (within a range similar to Example 1), other conditions such as a zeta potential of polishing grains and the like are changed. In the following references, the references are mutually compared with one another and satisfactorily show the effects of the invention, and should not be construed as limiting the invention thereto.

<References 1 to 4>

In References 1 to 3, a zeta potential of polishing grains in a polishing liquid was set at −10 mV or below in the mirror polishing step. Other conditions were same as in Example 1.

On the other hand, in Reference 4, a zeta potential of polishing grains in a polishing liquid in the mirror polishing step was set at −10 mV to 0 mV. Other conditions were same as in Example 1.

The relation between the zeta potential of polishing grains and the Duboff value in References 1 to 4 is shown in FIG. 3. According to FIG. 3, it has been found that the Duboff value is small within a range of the zeta potential of not larger than −10 mV and the end shape of the glass substrate 1 obtained after the mirror polishing step is good.

The Duboff value was measured by use of an electrophoretic light scattering method after the cleaning step subsequent to the mirror polishing treatment. More particularly, the glass substrate (for making a φ65 mm disk) was measured within a range of 29.9 to 31.5 mm from the center thereof.

When a magnetic disk for a vertical magnetic recording system was made using the above glass substrate 1 and subjected to such a head crashing test and glide height test as in Example 1, similar results as in the examples were obtained in References 1 to 3. In Reference 4, however, crashing by contact with a magnetic head took place. In view of this, it has been found that the end shape of a glass substrate for magnetic disk is important and if the end shape is not good, head crashing takes place when the substrate is used as a magnetic disk.

<Reference 5>

In Reference 5, a polishing pad containing neither cerium oxide nor zirconium oxide was used in a pre-polishing step. Other conditions were same as in Example 1.

As a result, a small number of defects were left in the surface of a glass substrate 1 after completion of the pre-polishing step. Accordingly, in order to obtain a mirror surface of the same quality as in Example 1 after the mirror polishing step performed on the glass substrate 1, a polishing time longer than in Example 1 was required. More particularly, it has been found that when the pre-polishing step is carried out using a polishing pad containing polishing grains such as of cerium oxide or zirconium oxide, the productivity of the glass substrate for magnetic disk and the magnetic disk can be improved.

<Reference 6>

In Reference 6, coarse particles were not removed from cerium oxide polishing grains contained in a polishing liquid. The measurement of the polishing liquid revealed that the polishing grains contained in the polishing liquid had a maximum size value of 10 μm, an average value of 1.6 μm and a D50 value of 1.6 μm.

As a result, a small number of defects were left in the surface of the glass substrate 1 after completion of the pre-polishing step. Accordingly, in order to obtain a mirror surface of such a quality as in Example 1 after the mirror polishing step performed on the glass substrate 1, a polishing time longer than in Example 1 was required. Thus, it has been found that when coarse particles are beforehand removed from the polishing liquid in the pre-polishing step, the productivity of the glass substrate for magnetic disk and the magnetic disk can be improved.

[Second Embodiment]

Another embodiment (second embodiment) of the invention is described below. It will be noted that such arrangements as in the first embodiment are not illustrated again for convenience's sake.

According to further studies made by us, it has been found that the dispersability of polishing grains in a polishing liquid influences the end shape and surface roughness of a glass substrate after polishing. More particularly, it has been discovered that where the dispersability of polishing grains is poor, the polishing grains mutually coagulate, thereby worsening the end shape and surface roughness of the glass substrate after polishing.

We have examined the problem from various standpoints of view in order to improve the dispersability of polishing grains in the polishing step. As a result, attention has been paid to the zeta potential of polishing grains. It has been found that not only there is a certain relation between the degree of dispersion or coagulation and the zeta potential of polishing grains, but also there is a causal relation between the zeta potential and the end shape and surface roughness.

Based on the above knowledge, we arrived, according to the invention, at a method for making a glass substrate for magnetic disk and a method for manufacturing a magnetic disk wherein a good end shape can be obtained after mirror polishing of a glass substrate. An embodiment of the invention (second embodiment) based on the above knowledge is now described.

The method for making a glass substrate for magnetic disk according to this embodiment is one which has a mirror polishing step including contacting a polishing pad with a surface of a glass substrate, supplying a polishing liquid containing polishing grains on the surface of the glass substrate, relatively moving the glass substrate and the polishing pad to polish the surface of the glass substrate, wherein the mirror polishing step is carried out while controlling a degree of coagulation or dispersion of the polishing liquid in such a way that a Duboff value indicating an end portion of the glass substrate obtained by the mirror polishing step is within ±10 nm.

For a method of controlling a degree of coagulation or dispersion of polishing grains in the polishing liquid, there is illustrated a method of realizing the above control by controlling a zeta potential of polishing grains. It will be noted that a method capable of controlling a degree of coagulation or dispersion in the polishing liquid should not be construed as being limited to this method, and there are, for example, many methods including a method of adding a dispersing material and the like, and thus, the invention should not be construed as limited to the control of zeta potential.

(Zeta Potential of Polishing Grains)

Polishing grains dispersed in a polishing liquid have a zeta potential. Where the zeta potential is closer to 0 mV than to −10 mV or +10 mV, the polishing grains are more liable to coagulation, thereby worsening the dispersability of the polishing grains in the polishing liquid. When the dispersability of polishing grains degrades, the flowability of the polishing grains in the vicinity of end portions of the glass substrate 1 lowers in the polishing step, with the possibility that the end shape of the glass substrate 1 after the polishing step degrades. The zeta potential may be changed to either plus or minus depending on the composition of target particles. The zeta potential of colloidal silica (colloid-shaped silica) usable as polishing grains becomes minus at a pH of 3.0 or over, is close to zero at a pH of 2.0 to 3.0, and becomes plus at a lower pH (at a pH of below 1).

Other conditions (e.g. a type of glass substrate, a polishing device, polishing conditions and the like) are same as in the first embodiment and their illustration is omitted.

The polishing liquid was so prepared as to meet such conditions as set out hereinabove and a mirror polishing step is carried out using this polishing liquid, thereby enabling a glass substrate for magnetic disk to be made as having an end shape more excellent than prior art counterparts.

(Effects of the Second Embodiment)

According to the method for making a glass substrate for magnetic disk and the method for manufacturing a magnetic disk of the second embodiment, the following effects (a) to (c) and the effects (a) to (g) attained by the first embodiment are shown.

(a) According to the second embodiment, the zeta potential of polishing grains in the polishing liquid is set at −10 mV or below or +10 mV or over (i.e. an absolute value is within a range of not smaller than 10 mV), for which the polishing grains can flow, without coagulation, in the vicinity of end portions of the glass substrate 1 in the mirror polishing step. Hence, coagulated polishing grains are prevented from staying the vicinity of the end portions, thereby leading to an improved end shape of the glass substrate 1 after completion of the mirror polishing step (i.e. the Duboff value is made small). More particularly, there can be provided a magnetic disk and a glass substrate for the magnetic disk wherein a magnetic head is able to record and reproduce information in the vicinity of an outer edge of the magnetic disk.

(b) According to the second embodiment, since a buffer agent is contained in the polishing liquid, the pH value of the polishing liquid is kept within a certain range, so that the polishing rate does not lower. Accordingly, there can be provided a method for making a glass substrate of magnetic disk and a method for manufacturing a magnetic disk, which are high in productivity.

(c) According to the second embodiment, since a buffer agent is contained in the polishing liquid, the pH value of the polishing liquid is kept within a certain range, so that the polishing rate does not lower. In other words, a once employed polishing liquid can be circulated and re-used. Thus, the amount of discharge of industrial emissions can be suppressed, making it possible to mass-produce a glass substrate for magnetic disk while taking care of the global environment.

EXAMPLES

Subsequently, examples related to the above embodiments of the invention are described along with comparative examples.

Example 1

A glass substrate for magnetic disk was made according to such a procedure as in Example 1 of the first embodiment except that the mirror polishing step is replaced by the following procedure.

(Mirror Polishing Step)

A polishing device 10 capable of polishing opposite main surfaces of 100 to 200 glass substrates at one time was used to carry out a mirror polishing step. A polishing pad used was a soft polisher.

A polishing liquid in the mirror polishing step was prepared by adding, to ultrapure water, sulfuric acid and tartaric acid and further colloidal silica particles having a grain size of 40 nm. The concentration of sulfuric acid in the polishing liquid was controlled to provide a pH value of the polishing liquid of 1.8. The concentration of tartaric acid was set at 0.8 wt % and the content of the colloidal silica particles was at 10 wt %. When the electric conductivity of the polishing liquid was measured, the value was at 6 mS/cm, whereupon the zeta potential of the polishing grains was at −11.3 mV.

During the mirror polishing treatment, no variation in the pH value of the polishing liquid was found and the pH could be kept substantially constant.

In this example, the polishing liquid supplied to the surface of the glass substrate 1 was collected by use of a drain and cleaned by removing foreign matters through a mesh filter, and re-used by supply to a glass substrate 1.

The polishing rate in the mirror polishing step was at 0.25 μm/minute, and it was found that a favorable polishing rate can be realized under such conditions as set out above. It will be noted that the polishing rate is calculated by dividing a reduction in thickness (machining allowance) of the glass substrate 1 necessary for finishing into a given mirror surface by a required polishing time.

(Inspection Step of a Glass Substrate for Magnetic Disk)

Subsequently, the glass substrate for magnetic disk was inspected. The surface roughness of the glass substrate for magnetic disk was measured by AFM (atomic force microscope), revealing that a maximum peak Rp was at 1.8 nm and an arithmetic mean roughness Ra was at 0.25 nm. The surface was in a clean mirror surface state. No foreign matters impeding the floating of a magnetic head and causing a thermal asperity problem were found.

(Step of Making a Magnetic Disk)

Next, a vertical magnetic recording disk was made by successively forming an adherent layer made of a Cr alloy, a soft magnetic layer made of a CoTaZr-based alloy, an underlying layer made of Ru, a vertical magnetic recording layer made of a CoCrPt-based alloy, a protective layer made of a hydrocarbon, and a lubricant layer made of a perfluoropolyether on the surface of the glass substrate for magnetic disk.

(Step of Inspecting the Magnetic Disk)

Next, the thus made magnetic disk was inspected.

A head crashing test was carried out wherein a head for inspection having a floating height of 8 nm was floated and run over the magnetic disk. As a result, the magnetic head was not in contact with a foreign matter and the like and no crashing trouble took place.

Next, using a magnetic head wherein a reproducing element unit was made of a magnetic resistance effect element and a recording element unit was made of a single polarization element and whose floating height was 8 nm, a recording and reproducing test using a vertical recording system was carried out, confirming that information could be normally recorded and reproduced. During the test, no thermal asperity signals were detected in reproducing signals. Recording and reproducing operations could be performed at 100 gigabits per unit square inch.

Thereafter, a glide height test of the magnetic disk was conducted. This test is to confirm a floating height at which the contact of a head for inspection with a magnetic disk occurs by gradually lowing the floating height of the head for inspection. As a result, with the magnetic disk of this example, no contact took place at a floating height of 4 nm over from an inner edge portion to an outer edge portion of the magnetic disk. The glide height at the outer edge portion of the magnetic disk was at 3.7 nm.

Examples 2 to 3 and Comparative Example 1

In Examples 2 to 3, the zeta potential of polishing grains in a polishing liquid in the mirror polishing step was adjusted to −10 mV or below. Other conditions were same as in Example 1. On the other hand, in Comparative Example 1, the zeta potential of polishing grains in a polishing liquid in the mirror polishing step was adjusted to from −10 mV to 0 mV. Other conditions were same as in Example 1.

The relation between the zeta potential of polishing grains and the Duboff value in Examples 1 to 3 and Comparative Example 1 is shown in FIG. 4. According to FIG. 4, it has been found that when the zeta potential is within a range of not larger than −10 mV, the Duboff value is small, which is good for the end shape of the glass substrate 1 after completion of the mirror polishing step.

The Duboff value was measured by use of an electrophoretic light scattering method after the cleaning step subsequent to the mirror polishing treatment. More particularly, the glass substrate (for making a φ65 mm disk) was measured within a range of 29.9 to 31.5 mm from the center thereof.

When a magnetic disk for a vertical magnetic recording system was made using the above glass substrate 1 and subjected to such a head crashing test and glide height test as in Example 1, no crashing by contact with the magnetic head took place in Examples 2 to 3. However, crashing by contact with the magnetic head took place in Comparative Example 1. This demonstrated that the end shape of the glass substrate for magnetic disk is important and when the end shape is poor, head crashing takes place upon use as a magnetic disk.

[References]

Subsequently, experimental examples wherein a zeta potential of polishing grains was same as in Example 1 and other conditions such as a pH of a polishing liquid and the like are changed is illustrated. It will be noted that the following references are mutually compared with one another, satisfactorily show the effects of the invention, and should not be construed as limiting the invention thereto.

<References 1 to 6>

In references 1 to 4, the composition of a polishing liquid in the mirror polishing step was adjusted so as to change a pH value of the polishing liquid within a range of from 1.0 to 3.0. Other conditions were same as in Example 1.

On the other hand, in References 5 and 6, the composition of a polishing liquid in the mirror polishing step was adjusted so as to change a pH value of the polishing liquid within a range of less than 1.0 or exceeding 3.0. Other conditions were same as in Example 1.

The relation between the pH value of the polishing liquid and the polishing rate in References 1 to 6 is shown in FIG. 5. According to FIG. 5, a favorable polishing rate can be realized when the pH value of the polishing liquid from 1.0 to 3.0.

<Reference 7>

In reference 7, no tartaric acid serving as a buffer agent was contained in a polishing liquid in the mirror polishing step. The pH value of the polishing liquid was adjusted to 2.0 by controlling an amount of sulfuric acid contained in the polishing liquid. Other conditions were same as in Example 1.

As a result, the pH value of the polishing liquid increased with a lapse of time in the mirror polishing step, thereby lowering the polishing rate. More particularly, it has been found that mixing of a buffer agent in a polishing liquid results in improved productivity of a glass substrate for magnetic disk and a magnetic disk.

<Reference 8>

In reference 8, a polishing pad containing neither cerium oxide nor zirconium oxide was used in the pre-polishing step. Other conditions were same as in Example 1.

As a result, a small number of defects were left in and on the surface of the glass substrate 1 after completion of the pre-polishing step. Accordingly, in order to obtain a mirror surface of the same quality as in Example 1 after the mirror polishing step performed on the glass substrate 1, a polishing time longer than in Example 1 was required. More particularly, it has been found that the productivity of the glass substrate for magnetic disk and the magnetic disk can be improved when the pre-polishing step is carried out using a polishing pad containing polishing grains such as of cerium oxide, zirconium oxide or the like.

<Reference 9>

In Reference 9, coarse particles were not removed from cerium oxide polishing grains contained in a polishing liquid. The measurement of the polishing liquid revealed that the polishing grains contained in the polishing liquid had a maximum size value of 10 μm, an average value of 1.6 μm and a D50 value of 1.6 μm.

As a result, a small number of defects were left in or on the surfaces of the glass substrate 1 after completion of the pre-polishing step. Accordingly, in order to obtain a mirror surface of the same quality as in Example 1 by performing the mirror polishing step on the glass substrate 1, a longer polishing time than in Example 1 was required. More particularly, it has been found that to remove coarse particles from a polishing liquid beforehand prior to the performance of the pre-polishing step leads to improved productivity of a glass substrate for magnetic disk and a magnetic disk.

The invention claimed is:

1. A method of making a glass substrate for a magnetic disk, comprising a mirror polishing step which includes contacting a polishing pad with a surface of a multi-component glass substrate, supplying a polishing liquid containing polishing grains to the surface of said glass substrate, and relatively moving said glass substrate and said polishing pad to polish the surface of said glass substrate, said magnetic disk allowing a magnetic head to fly at a floating height of 8 nm or less, wherein:

colloidal silica grains having a grain size of not larger than 80 nm are used as the polishing grains;

said polishing step being carried out under the conditions that the polishing liquid contains an inorganic acid and a buffer agent for preventing change in pH of the polishing liquid, that the pH value of the polishing liquid is kept at 3.0 or less, and that a zeta potential of said polishing grains contained in the polishing liquid is not higher than −24.7 mV, in order to control a degree of coagulation or dispersion in said polishing liquid so that a Duboff value which shapes an end contour of the resulting glass substrate obtained by the mirror polishing step falls within ±10 nm.

2. The method of making a glass substrate for a magnetic disk as defined in claim 1, wherein the multi-component glass is an aluminosilicate glass.

3. The method of making a glass substrate for a magnetic disk as defined in claim 1, wherein said buffer agent is composed of an organic acid.

4. The method of making a glass substrate for a magnetic disk as claimed in claim 1, wherein the mirror polishing step includes polishing the glass substrate so that the surface roughness of the glass substrate is 0.3 nm or less in arithmetic mean roughness (Ra) and is 2 nm or less in maximum peak (Rp).

5. The method of making a glass substrate for a magnetic disk as claimed in claim 1, further comprising a step of pre-polishing the glass substrate using cerium oxide grains having a grain size of less than 4 μm.

6. The method of making a glass substrate for a magnetic disk as claimed in claim 1, wherein the mirror polishing step is carried out while the zeta potential is kept at −30 mV or less.

7. A method of manufacturing a magnetic disk, wherein a magnetic layer is formed on the glass substrate manufactured by the use of a method of making a glass substrate for a magnetic disk as defined in claim 1.

* * * * *